Patented Oct. 21, 1952

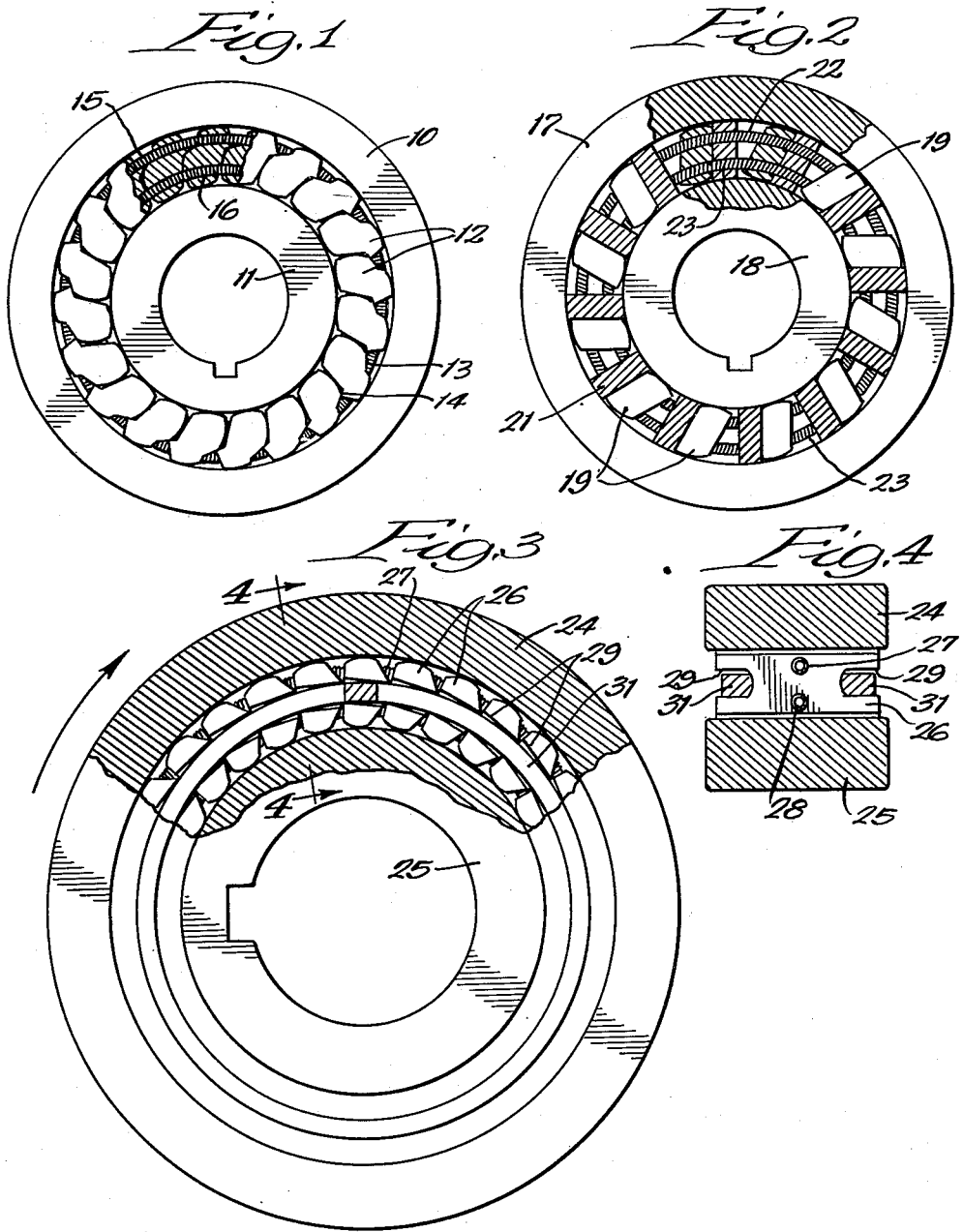

2,614,669

UNITED STATES PATENT OFFICE 2,614,669

SPRAG TYPE ONE-WAY CLUTCH

Adiel Y. Dodge, Rockford, Ill.

Application February 19, 1948, Serial No. 9,458

4 Claims. (Cl. 192—45.1)

This invention relates to one-way clutches and more particularly to a construction which will serve as a one-way clutch and as a bearing.

One-way clutches of the tiltable gripper type have heretofore been proposed, but in these constructions it has been necessary to provide separate mechanism to form bearing surfaces so that the unit can act as a bearing during overrunning. It is one of the objects of the present invention to provide a one-way clutch in which the surfaces of the tiltable grippers themselves may function as bearing surfaces.

It is another object to provide a one-way clutch in which tilting of the grippers toward their disengaged position is positively limited so that the grippers may function as bearing members. Limiting of the gripper tilting may be accomplished in various ways including the provision of interengaging shoulders on the grippers themselves, the provision of a cage having cross bars to engage and limit tilting of the grippers, and the provision of annular stop rings fitting loosely into openings in the grippers.

Still another object is to provide a one-way clutch in which the grippers are urged toward engaged position by annular springs and are positively limited in their movement toward disengaged position. This construction prevents excessive deflection of the springs which might result in damage thereto.

A further object is to provide a one-way clutch in which the grippers are controlled by radially spaced annular springs. Preferably the outermost spring has an excessive length so that it is under compression and will urge the outer ends of the grippers toward the outer race while the inner spring is under tension to urge the inner ends of the grippers toward the inner race. This construction holds the opposite ends of the grippers in frictional contact with the races so that upon a reversal of torque from the overrunning direction the grippers will engage the races rapidly.

The above and other objects and advantages of the invention will be more readily apparent when read in connection with the accompanying drawing, in which—

Figure 1 is a side elevation with parts in section of a one-way clutch embodying the invention;

Figures 2 and 3 are views similar to Figure 1 illustrating alternative constructions; and Figure 4 is a section on the line 4—4 of Figure 3.

The construction as shown in Figure 1 comprises an outer annular race 10 and an inner race 11. The races have coaxial cylindrical facing surfaces between which are arranged a series of tiltable grippers 12. The ends of the grippers are eccentrically curved so that when they are tilted counter-clockwise as seen in Figure 1 they will grip the races and hold them against relative rotation and when they are tilted clockwise they will release the races.

According to the present invention, tilting of the grippers toward the released position is limited by forming the grippers with interfitting shoulders. As shown, each gripper is formed at one side with an outwardly facing shoulder 13 and at its opposite side with an inwardly facing shoulder 14. When the grippers are arranged between the races, the shoulder 13 on one gripper will underlie the shoulder 14 on the next adjacent gripper. With this construction the grippers can tilt counterclockwise freely, but when they tilt clockwise, the shoulders 14 will engage the adjacent shoulders 13 positively to limit tilting. Preferably the shoulders are so proportioned that when the grippers are in their extreme release position their ends will have a slight clearance at the race surfaces sufficient to permit an oil film. With this construction the grippers will hold the races accurately centered and their ends form rigid bearing surfaces on which the races may ride. Therefore, in the overrunning direction the grippers function as bearing members similar to slipper bearings.

The grippers are preferably urged to tilt toward their engaged position by annular coil springs 15 and 16. As shown, the spring 15 extends through openings in the grippers adjacent their outer ends, and the spring 16 extends through similar openings in the grippers adjacent their inner ends. To urge the grippers toward engaged position the outer spring 15 is formed with a slightly excessive length so that it is under compression and the inner spring is under tension. Thus the outer spring tends to force the outer ends of the grippers into engagement with the outer race and the inner spring tends to draw the inner ends of the grippers into engagement with the inner race. With this construction the grippers tend to maintain frictional contact with the races at their opposite ends. Therefore, upon relative rotation of the races in the locking direction, the friction forces of the races on the ends of the grippers will assist in tipping them toward their gripping position so that a very rapid engagement is insured with a minimum of backlash.

The construction of Figure 2 includes an outer annular race 17 and an inner annular race 18 between which are arranged a series of tiltable grippers 19 having eccentrically curved ends. The grippers 19 are formed with flat parallel sides and are spaced by cage cross bars 21 also having flat parallel sides. The grippers may be urged to engaged position by inner and outer annular springs 22 and 23 which function in the same manner as the springs 15 and 16 of Figure 1. Preferably the springs and openings are arranged so that when the grippers are tilted toward their disengaged position the springs will be bent slightly as more particularly described and claimed in the patent to Swenson, No. 2,386,013.

In the construction of Figure 2, the cage bars 21 lie at such an angle to a radius through them that they will engage the flat sides of the adjacent grippers and limit tilting thereof toward the disengaged position. Thus the grippers provide rigid bearing surfaces of the slipper type during overrunning.

An additional feature of this construction which is also present in Figure 1 is that the limiting of the tilting of the grippers prevents excessive tilting which might damage the springs. Without some means to limit tilting, it is apparent that excessive tilting of the grippers might bend the springs to an extent which would damage them. When the tilting is positively limited as in the construction shown damage to the springs is prevented and a long useful life of the mechanism is insured.

The construction of Figures 3 and 4 embodies all of the features of Figures 1 and 2 except for an alternative construction of the gripper stops. As shown, this construction comprises an outer cylindrical race 24 and an inner cylindrical race 25 between which are arranged a series of tiltable grippers 26. As shown, the grippers 26 are bulged out at one side so that they may engage each other without interfering in any way with their tilting movement. The grippers are urged toward engaged position by inner and outer coil springs 27 and 28 which function in the same manner as the springs 15 and 16 of Figure 1.

To limit tilting movement of the grippers, each gripper is formed in one or both ends with a rectangular notch 29. Annular rings 31 of rectangular section are fitted into the notches and are narrower than the notches to leave a clearance so that the grippers may tip. When the grippers are in the position shown in Figure 3, the opposite ends of the notches engage the rings 31 so that the grippers cannot tilt further clockwise. Thus their tilting is positively limited so that they will provide rigid bearing surfaces on which the races may run during overrunning.

While several embodiments of the invention have been shown and described in detail herein, it will be understood that these are illustrative only and are not to be taken as a definition of the scope of the invention, reference being had for this purpose to the appended claims.

What is claimed is:

1. A one way clutch comprising inner and outer coaxial races, a series of tiltable grippers between the races having eccentrically curved ends to grip the races when tilted in one direction and to release the races when tilted in the other direction, stop means engageable with the grippers to limit tilting thereof in said other direction, the grippers having an outer series of openings therein adjacent their outer ends and a second series of openings therein adjacent their inner ends, and annular coil springs in the series of openings, the spring in the outer series of openings tending to expand and the spring in the inner series of openings tending to contract thereby to hold the ends of the grippers in engagement with the races respectively.

2. A one way clutch comprising inner and outer coaxial races, a series of tiltable grippers between the races having their ends eccentrically curved to grip the races when tilted in one direction and to release the races when tilted in the other direction, the grippers having an outer series of openings therein adjacent their outer ends and an inner series of openings therein adjacent their inner ends, and annular coil springs extending through the respective series of openings, the outer spring being under compression to urge the grippers outward and the inner spring being under tension to urge the grippers inward thereby to hold the ends of the grippers in contact with the races.

3. A one way clutch comprising inner and outer coaxial races, a series of tiltable grippers between the races having eccentrically curved ends to grip the races when tilted in one direction and to release the races when tilted in the other direction, the grippers being formed with inwardly facing shoulders at one side and outwardly facing shoulders at the other side to engage the shoulders on adjacent grippers and limit tilting in said other direction, the grippers having openings therethrough, and an annular spring threaded through the openings in the grippers and urging them in said one direction.

4. A one way clutch comprising inner and outer coaxial races, a series of tiltable grippers between the races having eccentrically curved ends to grip the races when tilted in one direction and to release the races when tilted in the other direction, the grippers being formed with with inwardly facing shoulders at one side and outwardly facing shoulders at the other side to engage the shoulders on adjacent grippers and limit tilting in said other direction, the grippers having inner and outer series of openings therein, and annular springs extending through the openings, the outer spring being under compression and the inner spring being under tension.

ADIEL Y. DODGE.

REFERENCES CITED

The following references are of record in the file of this patent:

UNITED STATES PATENTS

| Number | Name | Date |
|---|---|---|
| 2,386,013 | Swenson | Oct. 2, 1945 |
| 2,388,424 | Lund | Nov. 6, 1945 |

FOREIGN PATENTS

| Number | Country | Date |
|---|---|---|
| 298,673 | Great Britain | Oct. 15, 1928 |